Figure 1:
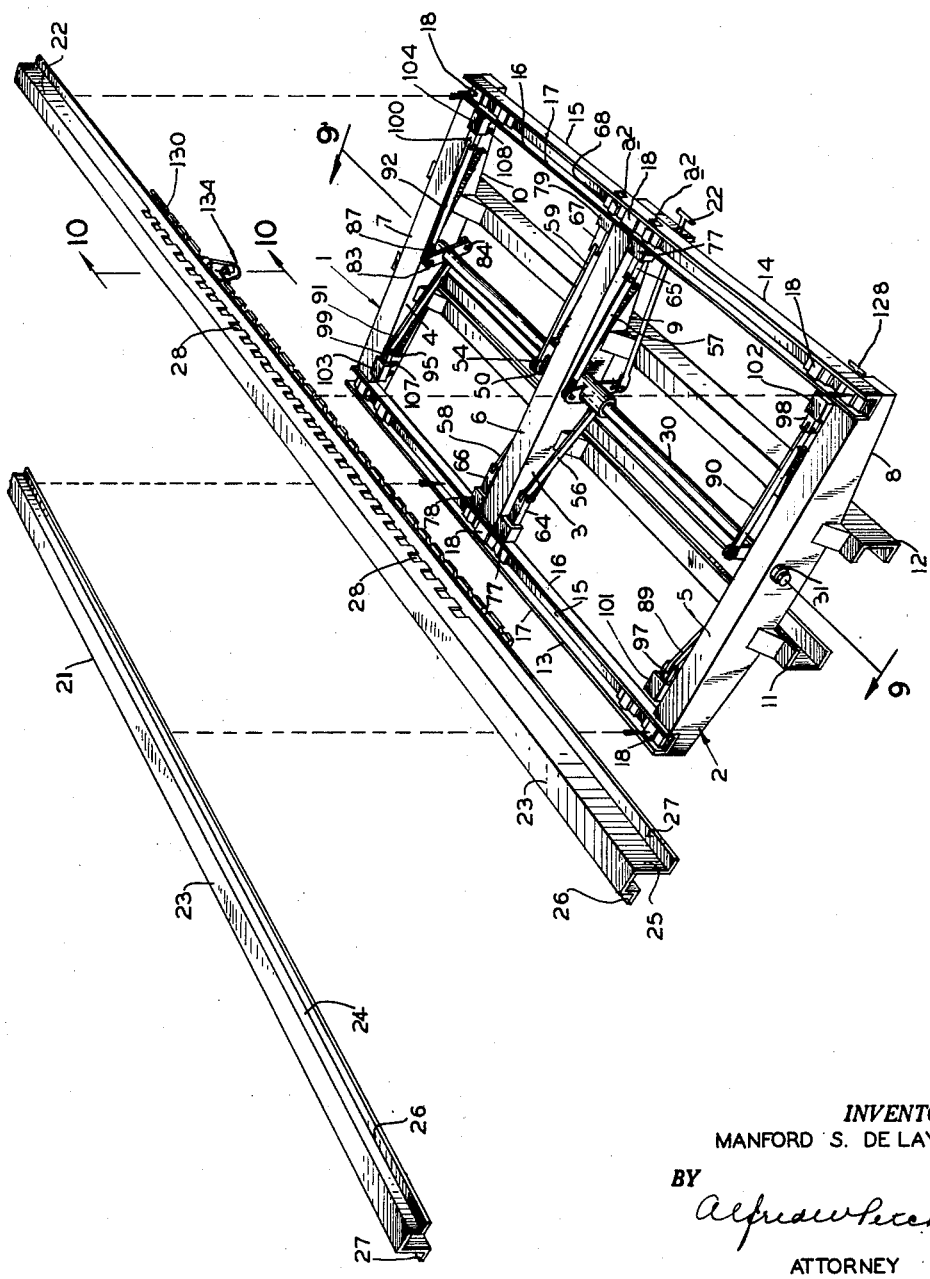

Nov. 10, 1964  M. S. DE LAY  3,156,485
TRAILER LOAD-EQUALIZING MECHANISM
Filed Dec. 21, 1961  5 Sheets-Sheet 1

INVENTOR.
MANFORD S. DE LAY
BY
ATTORNEY

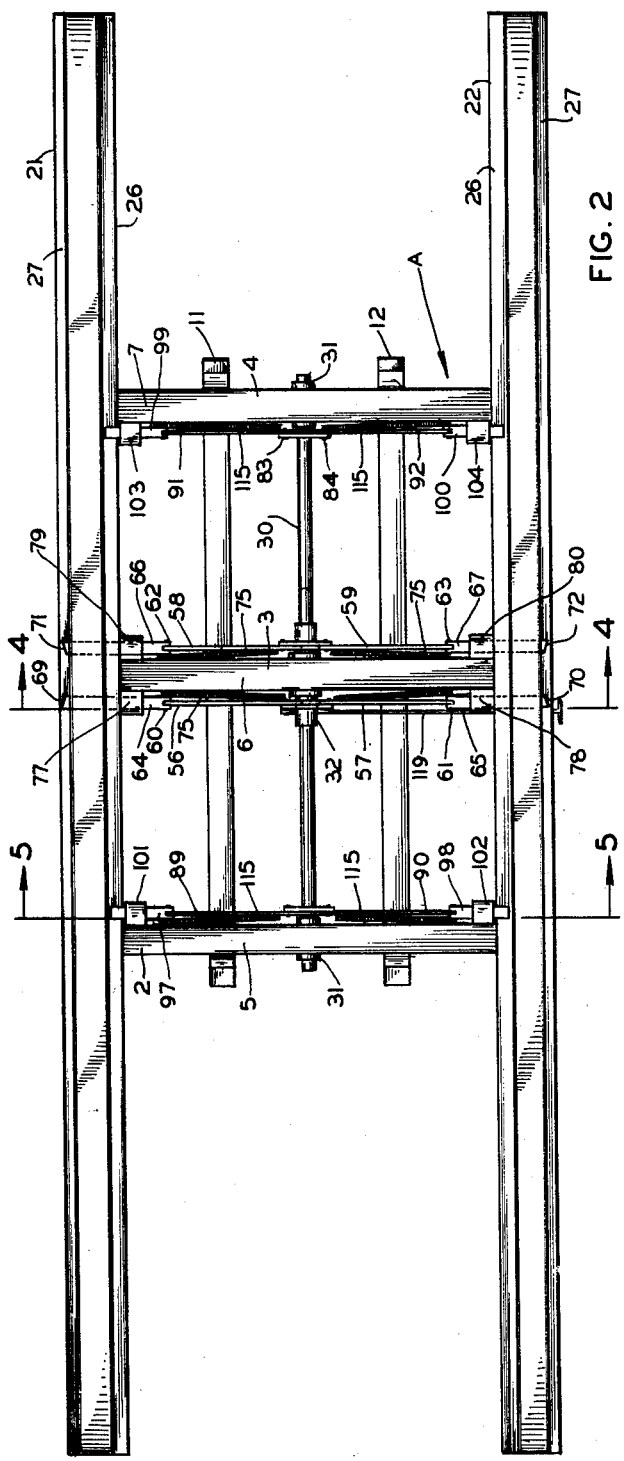
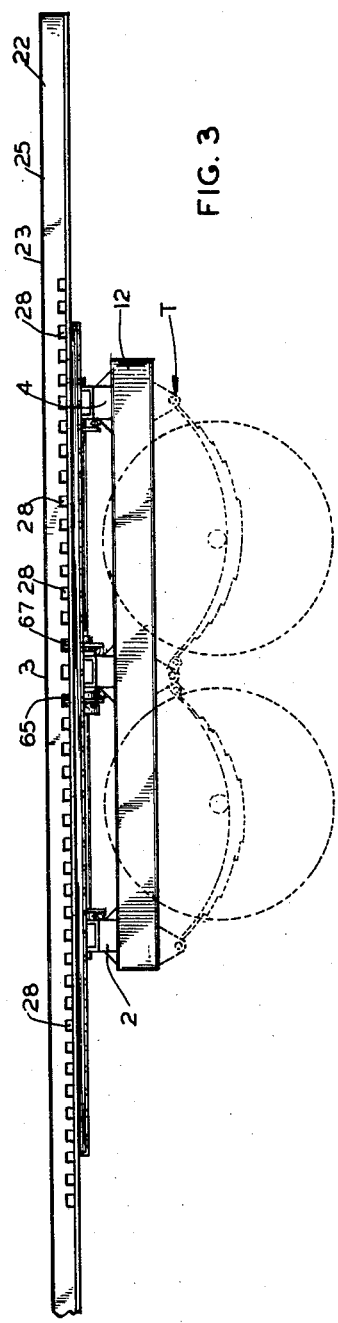

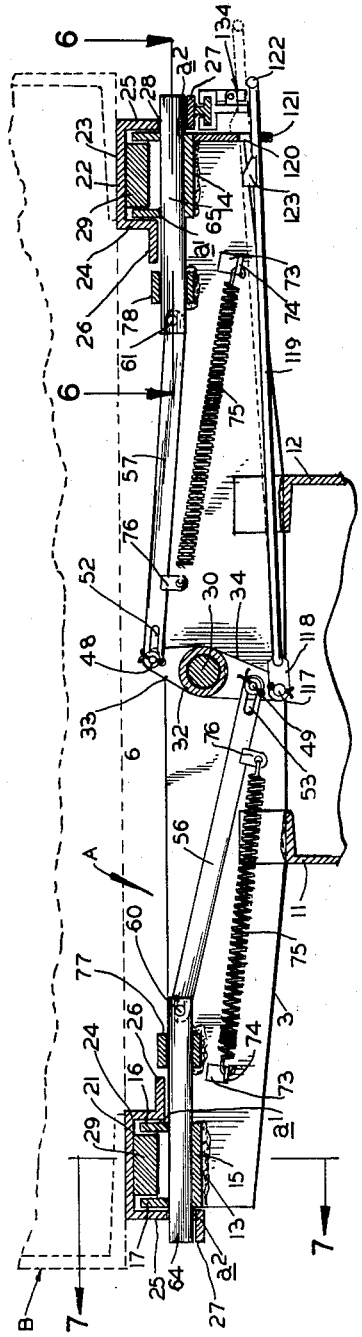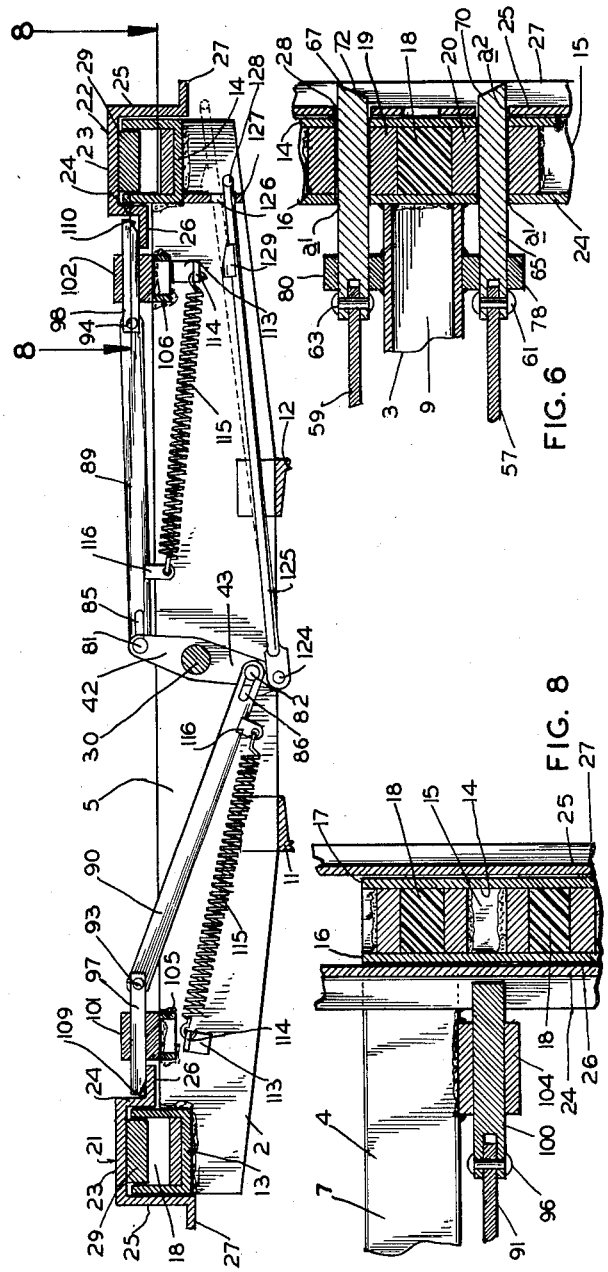

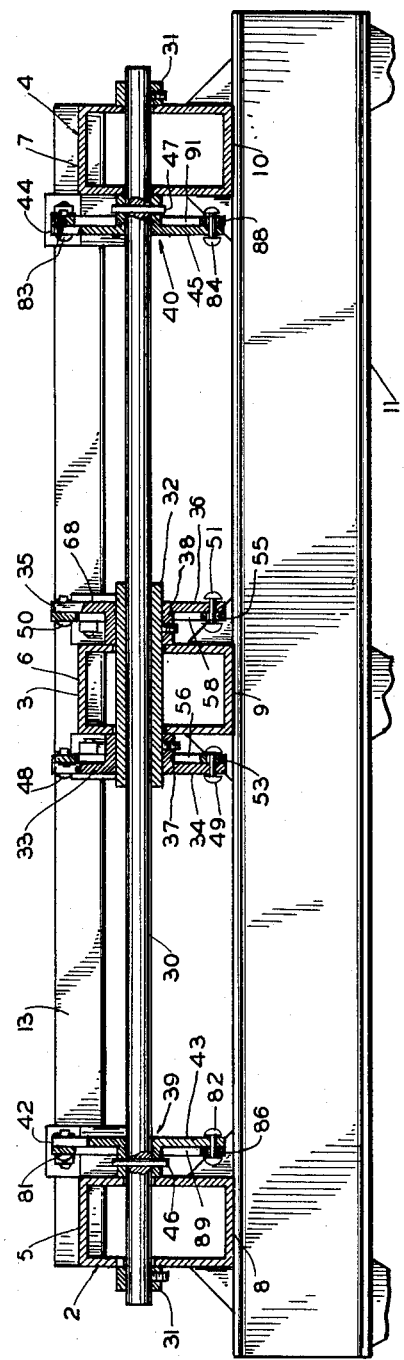

Nov. 10, 1964   M. S. DE LAY   3,156,485
TRAILER LOAD-EQUALIZING MECHANISM
Filed Dec. 21, 1961   5 Sheets-Sheet 5

INVENTOR.
MANFORD S. DE LAY
BY
*Alfred W. Petchaft*
ATTORNEY

United States Patent Office 3,156,485
Patented Nov. 10, 1964

3,156,485
TRAILER LOAD-EQUALIZING MECHANISM
Manford S. De Lay, St. Louis County, Mo. (2117 Gravois Ave., St. Louis, Mo.), assignor of twenty-one and fifty-five one-hundredths percent to Robert B. Meihaus, Warrenton, Mo., and of twenty-one and fifty-five one-hundredths percent to Glennon T. Moran, St. Louis, Mo.
Filed Dec. 21, 1961, Ser. No. 161,036
7 Claims. (Cl. 280—81)

This invention relates in general to certain new and useful improvements in load-carrying vehicles, such as tractor-trailer trucks, and relates, more particularly, to load-equalizing devices by which the truck-body can be adjustably connected to the running gear.

Because of the wide variations in the loads which may be carried by any particular automotive truck or tractor-trailer unit from time to time, it has become necessary to employ means for adjusting the distance between the front running gear and the rear running gear of such a unit which will create equal distribution of the loads, such as, for example, shown in United States Letters Patents Nos. Re. 23,704, 2,818,272, and 2,900,194. Such load-equalizing devices are mounted inside the wheels and are usually referred to in the industry as "inside slides." However, a need has arisen for a load-equalizing device in which the longitudinally sliding rails can be mounted at the outer extremities of the cross rails of the rear-axle tandem assembly, or, in other words, adjacent to the outer extremities of the trailer or truck-body. Such load-equalizing devices have come to be referred to in the industry as "outside slides," but those which have thus far been developed are cumbersome, expensive and have proven to be structurally weak when subjected to the wracking and torsional stresses of over-the-road hauling.

It is, therefore, the primary object of the present invention to provide a load-equalizing longitudinally adjustable slide of the type stated which is strong, durable, and efficient in operation.

It is another object of the present invention to provide a load-equalizing slide of the type stated which has strong secure locking means by which the trailer or truck-body may be held in place on the tandem, but, nevertheless, may be easily released so that longitudinal adjustment may be effected easily and conveniently.

It is also an object of the present invention to provide an outside slide in which the load may be supported on a plurality of slide-elements which are lubricated from a plurality of built-in "grease pockets" so that load-equalizing adjustment can be easily and smoothly effected.

It is a further object of the present invention to provide a load-equalizing slide of the type stated which can be shifted through various positions of adjustment in relatively small increments and automatically locked in any one of a plurality of preselected positions.

It is an additional object of the present invention to provide a load-equalizing device which may be readily adapted to, and mounted upon, various different types of rear-axle tandem assemblies and truck or trailer bodies, and, by mere changes of dimensions and proportions, can be designed for use either as an inside slide or an outside slide.

It is a further object of the present invention to provide a load-equalizing device of the type stated having locking means which may be partially withdrawn from locked position in order to permit longitudinal adjustment while retaining the slide-elements in assembled relation and can also be fully withdrawn from locked position so that the trailer or truck-body can be entirely separated from the rear-axle tandem assembly, if desired.

With the above and other objects in view, my invention resides in the novel features of form, construction, arrangement, and combination of parts presently described and pointed out in the claims.

Figure 12:
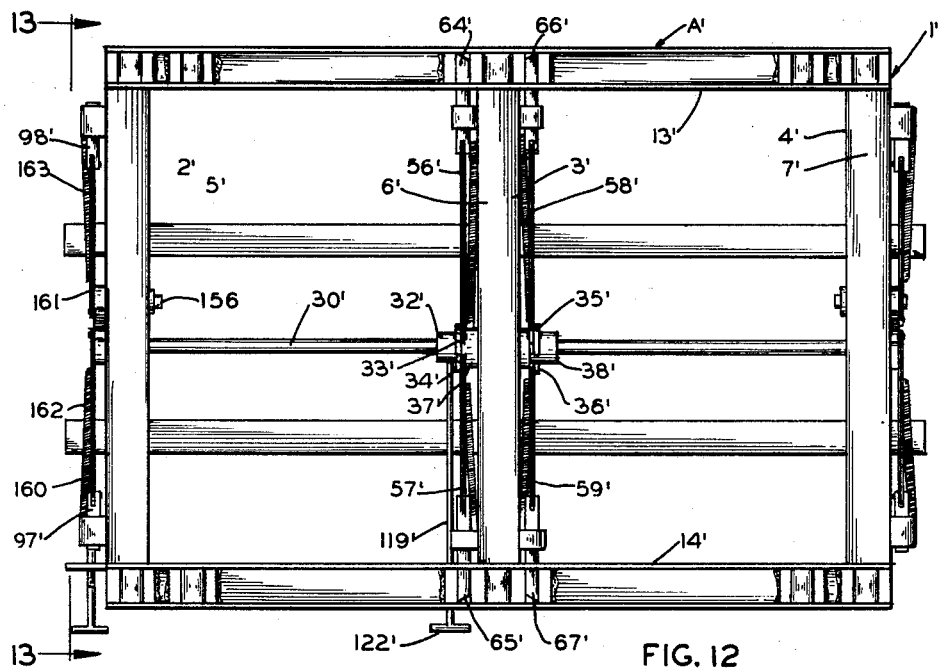
Figure 13:
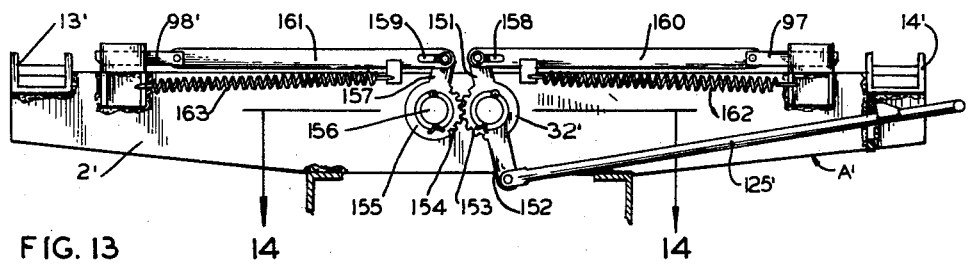
Figure 14:
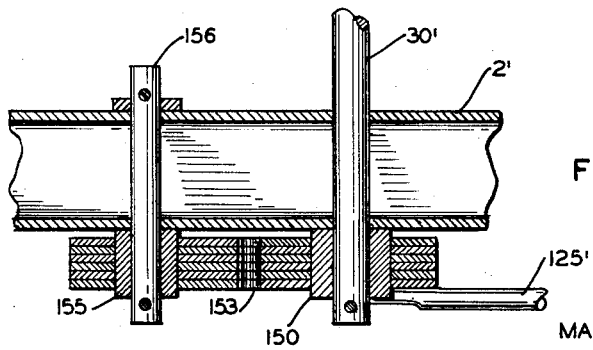

In the accompanying drawings (five sheets):
FIG. 1 is an exploded perspective view of a load-equalizing device constructed in accordance with and embodying the present invention;
FIG. 2 is a top plan view of the load-equalizing device of the present invention;
FIG. 3 is a side elevational view of a load-equalizing device constructed in accordance with and embodying the present invention;
FIGS. 4 and 5 are transverse sectional views taken along lines 4—4 and 5—5, respectively, of FIG. 2;
FIGS. 6 and 7 are fragmentary sectional views taken along lines 6—6 and 7—7, respectively, of FIG. 4;
FIG. 8 is a fragmentary sectional view taken along line 8—8 of FIG. 5;
FIG. 9 is a longitudinal sectional view taken along line 9—9 of FIG. 1;
FIG. 10 is a fragmentary sectional view taken along line 10—10 of FIG. 1;
FIG. 11 is a fragmentary sectional view taken along line 11—11 of FIG. 10;
FIG. 12 is a top plan view of a modified form of load-equalizing device constructed in accordance with and embodying the present invention;
FIG. 13 is a transverse sectional view taken along line 13—13 of FIG. 12; and
FIG. 14 is a fragmentary sectional view taken along line 14—14 of FIG. 13.

Referring now in more detail and by reference characters to the drawings, which illustrate practical embodiments of the present invention, A designates a load-equalizing device for adjustably and detachably connecting a truck-body B to the rear-axle tandem T. Since the truck-body B and rear-axle tandem T are conventional and do not, per se, constitute part of the present invention, they are not shown or described herein. The load-equalizing device A comprises a base-frame 1 consisting of three transversely extending spaced parallel cross-members 2, 3, 4, of identical size and shape. As will be seen by reference to FIG. 1, the cross-members 2, 3, 4, are of substantially tubular internal shape, having flat, horizontal top flanges 5, 6, 7, and bottom flanges 8, 9, 10, respectively, which are securely welded to longitudinal frame-members 11, 12, adapted for securement to the rear-axle tandem T.

Notched into the top flanges 5, 6, 7, of the cross-members 2, 3, 4, and securely welded in place are longitudinally extending, upwardly opening, slide-channels 13, 14, each integrally including a flat web 15 and side-flanges 16, 17. Disposed internally within the slide-channels 13, 14, at suitably spaced intervals, are rectangular slide-blocks 18 formed preferably of a hard, dense, phenolic resin or similar material capable of supporting substantial compressive stresses and, at the same time, affording a desirable anti-friction surface. It will be noted by reference to FIGS. 3 and 6 that the slide-blocks 18 are shorter in vertical dimension than the depth of the slide-channels 13, 14, and, consequently, the horizontal top faces of the slide-blocks 18 will be disposed downwardly below the plane of the top margins of the slide-channels 13, 14. It will also be noted by reference to FIG. 6 that the slide-blocks 18 are held against longitudinal shifting movement by pairs of small, transverse cross-bars 19, 20, which are welded to the bottom flanges of the slide-channels 13, 14. Furthermore, a slide-block 18 is located adjacent to each end of the slide-channels 13, 14, so as to form a transverse closure therefor. The space or so-called "pockets" between the slide-blocks 18 within the slide-channels 13, 14, are filled with grease or some other suitable solid or highly viscous lubricant to provide so-called built-in "grease pockets" or "oil pockets," depending upon the type of lubricant used.

Welded or otherwise rigidly secured to, and extending lengthwise along, the under-face of the truck-body B are slide-rails 21, 22, which are similar in shape and construction, being formed of channels, each integrally including a top web 23, inner and outer side-plates 24, 25, an inner lateral flange 26, and an outer lateral flange 27. In this connection, it should be noted that the outer side-plate 25 is greater in vertical height than the inner side-plate 24. Similarly, the inner lateral flange 26 is wider than the outer lateral flange 27. Finally, each of the outer side-plates 25 is provided with a longitudinally extending series of uniformly spaced rectangular apertures or openings 28. Welded or otherwise rigidly secured to the under-face of each of the top-webs 23 and extending longitudinally therealong are slide-bars 29 which are of the same length as, but somewhat narrower in transverse width than, the slide-rails 21, 22. Moreover, the slide-bars 29 are substantially smaller in vertical height than the side-plates 24, 25, being disposed in symmetrical relationship within the slide-rails 21, 22, so that their longitudinal margins are spaced equidistantly inwardly from the adjacent faces of the side-plates 24, 25, so as to fit freely and slidably down into the slide-channels 13, 14, as best seen in FIG. 4, upon the slide-blocks 18 in lubricative contact with the lubricant loaded into the "pockets" therebetween. In fact, the slide-channels 13, 14, are preferably filled with lubricant above the level of the top surfaces of the slide-blocks 18 so that the entire interior of the slide-channels 13, 14, are, in effect, lubricant reservoirs. The upper horizontal surfaces of the cross-bars 19, 20, are spaced downwardly from the top surfaces of the slide-block 18 so as to avoid any interference with the longitudinal sliding movement of the slide-bars 29 upon the upwardly presented horizontal surfaces of the slide-block 18, all as best seen in FIG. 7.

Journaled centrally in, and extending horizontally through, the cross-members 2, 3, 4, is a shaft 30 provided on its external ends with set collars 31. Rotatably mounted on the shaft 30, adjacent to and extending through, the center cross-member 3 is an actuator-sleeve 32 integrally provided with two pairs of diametrically outwardly extending crank arms 33–34, 35–36, which are operatively spaced from side faces of the cross-member 3 by thrust-collars 37, 38. The shaft 30 is also provided, adjacent the inwardly presented faces of the outer cross-members 2, 4, with two actuator-members 39, 40, each integrally including sleeves 41 and diametrically outwardly extending pairs of crank arms 42–43, 44–45, the sleeves being rigidly secured to the shaft 30 by pins 46, 47. The pairs of crank arms 33–34, and 35–36, are respectively provided in their outer ends with horizontal pins 48–49, 50–51 for operative engagement in slots 52, 53, 54, 55, respectively formed in the inner ends of pull-rods 56, 57, 58, 59, which are, in turn, rockably connected at their outer ends by pins 60, 61, 62, 63, to locking-bars 64, 65, 66, 67, which are slidably mounted in and extend through transversely aligned rectangular apertures $a^1$, $a^2$, formed in the pairs of side flanges 16, 17, of the slide-channels 13, 14. It will be noted in this connection that the paired apertures $a^1$, $a^2$, are aligned with the outwardly presented transverse faces of the cross-bars 19, 20, so that such lateral faces will act as sliding guide surfaces for the contiguous lateral faces of the locking-bars 64, 65, 66, 67, respectively. In addition, secondary guide blocks 68 are welded or otherwise rigidly mounted within the slide-channels 13, 14, for sliding engagement with the opposite lateral faces of the locking-bars 64, 65, 66, 67, all as best seen in FIG. 6. Moreover, as will be seen by reference to FIG. 4, the pairs of apertures $a^1$, $a^2$, are substantially in the same vertical level as the row of apertures 28 in each of the slide-rails 21, 22, when the latter rest upon the slide-blocks 18. Consequently, when the locking-bars 64, 65, 66, 67, are shifted outwardly into the so-called "locked position," as shown in FIG. 4, the locking-bars 64, 65, 66, 67, will extend outwardly and engage within the particular apertures 28 which happen to be in alignment therewith. Thus, the slide-rails 21, 22, will be permanently held in some selected position of longitudinal adjustment with reference to the tandem T.

Preferably, though not necessarily, the outer transverse ends of the locking-bars 64, 65, 66, 67, are beveled inwardly to provide inclined faces 69, 70, 71, 72, respectively. Consequently, if the apertures 28 are not precisely in line with the pairs of apertures $a^1$, $a^2$, either the locking-bars 64, 66, or 65, 67, or the proximate apertures 28 will lock the slide-rails 21, 22. Thereafter, upon the initial movement of the truck there will be some slight amount of relative shifting movement between the slide-rails 21, 22, and the slide-channels 13, 14, which is sufficient to allow the locking-bars 64, 65, 66, to snap outwardly into fully locked position in case they have not already done so.

Welded or otherwise rigidly attached to the lateral faces of the cross-member 3 are L-shaped brackets 73 having outwardly projecting apertured flanges 74 for hooked engagement in the outer ends of tension springs 75 which are, in turn, hooked into the depending ears 76 which are welded or otherwise rigidly attached to the undersides of the pull-rods 56, 57, 58, 59, as best seen, for instance, in FIG. 4. It will thus be evident that the springs 75 normally bias the locking-bars 64, 65, 66, 67, into locked engagement with the slide-rails 21, 22. Also welded to the lateral faces of the cross-member 3 are horizontally projecting guide blocks 77, 78, 79, 80, which are provided with rectangular apertures for slidably accommodating the locking-bars 64, 65, 66, 67, respectively, for cooperating with the paired apertures $a^1$, $a^2$, in maintaining the proper horizontal or working-position of the locking-bars 64, 65, 66, 67, all as best seen in FIG. 4.

Similarly mounted in the outer ends of the crank arms 42–43, 44–45 are horizontal pins 81, 82, 83, 84, respectively, for operative engagement in longitudinal slots 85, 86, 87, 88, of pull-rods 89, 90, 91, 92, respectively, which are, in turn, operatively connected at their outer ends by means of pins 93, 94, 95, 96, to locking-bars 97, 98, 99, and 100, which are, in turn, slidably seated in guide bars 101, 102, 103, 104, welded to brackets 105, 106, 107, 108, respectively, fixed upon and extending horizontally outwardly from the cross-members 2, 4. The locking-bars 97, 98 are chamfered on the underside of their outwardly presented transverse margins to provide beveled surfaces 109, 110, and are of such length so as to fit over the top of and engage the upwardly presented surfaces of the inner flanges 26 of the slide-rails 21, 22, respectively when in locked position, as shown in FIG. 5. The locking-bars 99, 100, are similarly chamfered on the underside of their outwardly presented transverse margins to provide beveled surfaces (not shown) but are similar to the beveled surfaces 109, 110. The locking-bars 99, 100, are also of such length so as to fit over the top of and engage the upwardly presented surfaces of the inner flanges 26 of the slide-rails 21, 22, respectively, when in the locked position. Welded or otherwise rigidly attached to the lateral faces of the cross-members 2, 4, are brackets 113, having apertured horizontal flanges 114 for hooked engagement in tension springs 115 which are, in turn, hooked at their inner ends to depending ears 116 rigidly secured to the pull-rods 89, 90, 91, 92 thereby normally biasing the locking-bars 97, 98, 99, 100, into locked position. In such locked position, the locking-bars 97, 98, 99, 100, will prevent the slide-rails 21, 22, from bouncing upwardly or being lifted upwardly out of engagement with the slide-channels 13, 14. As a result, the truck-body B is thereby prevented from authorized displacement or removal from the tandem T. However, the locking-bars 97, 98, 99, 100, do not, in any way, interfere with the horizontal shifting movement of the slide-rails 21, 22, with respect to the slide-channels 13, 14, and therefore, do not interfere with the load-equalizing adjustment of the truck-body B with respect to the tandem T.

Pivotally secured to the lower end of the crank arm 34, by means of a pin 117 and clevis-fitting 118, is an actuator-rod 119 which extends slidably and shiftably through a vertical slot 120 formed in a vertical guide plate 121, which is welded or otherwise rigidly secured on the forwardly presented lateral face of the cross-member 3. At its outwardly projecting end, the actuator-rod 119 is integrally provided with a handle 122 by which it may be manually operated. Intermediate its ends, the actuator-rod 119 is provided with an upstanding detent-boss 123 which is spaced outwardly from the shaft 30 by a predetermined distance, so that when the actuator-rod 119 is manually pulled outwardly and lifted, the detent-boss 123 will engage against the guide plate 121 in the position shown in dotted lines in FIG. 4.

When the actuator-rod 119 is pulled outwardly, the sleeve 32 and its associated crank arms 33–34, will be rocked in a counterclockwise direction (reference being made to FIG. 4) and the shaft 30 will be rotated, thereby causing the pull-rods 56, 57, 58, 59, to move inwardly, shifting the locking-bars 64, 65, 66, 67 inwardly, and withdrawing them from engaged or "locked" position. In this position, the ends of the locking-bars 64, 65, 66, 67, are completely disengaged from the apertures 28. Thus, the truck-body B may be shifted longitudinally with respect to the tandem T and load-equalizing adjustment thus effected. However, the locking-bars 97, 98, 99, 100, still prevent vertical removal of the truck-body B from the tandem T as above pointed out.

Pivotally secured to the lower end of the crank arm 43 by means of a pin 124, is an actuator-rod 125 which extends shiftably through a vertical slot 126 in a vertical guide plate 127, which is welded or otherwise rigidly secured on the outer end of the cross-member 2. At its outwardly projecting end the actuator-rod 125 is provided with a handle 128 by which the actuator-rod 125 may be manually operated. Intermediate its ends the actuator-rod 125 is provided with an upstanding detent-boss 129 which is spaced outwardly from the shaft 30 by a predetermined distance so that when the actuator-rod 128 is manually pulled outwardly and lifted, the detent-boss 129 will engage the guide plate 127 in the position shown in dotted lines in FIG. 5. In this position, the locking-bars 97, 98, 99, 100, will be withdrawn from overlying relationship above the inner flanges 26 of the slide-rails 21, 22, to permit complete removal of the truck-body B from the tandem T for repair, or pig-a-back railroad transportation.

Provided for rigid securement upon the under-face of the outer flange 27 of the slide-rail 22 is a pre-selector rail 130 having a T-shaped cross-section and integrally including a vertical web 131 and horizontal cross-flange 132, which is provided along its outwardly presented margin with a plurality of uniformly spaced semi-circular detent-notches or recesses 133. Slidably mounted upon the pre-selector rail 130 for manual adjustment to any one of a number of selected longitudinal positions therealong is a pre-selector cam 134 integrally including a slotted head 135 adapted for sliding engagement along the cross-flange 132 and having an outwardly presented bifurcating slot 136 for loosely accommodating the upper end of a latch-pin 137 which is pivotally mounted intermediate its ends upon a horizontal pintle 138. The horizontal pintle 138 extends between laterally projecting ears 139, 140, formed integrally upon the outwardly presented face of a camming plate 141, which is, in turn, integrally mounted at its upper end upon, and projecting vertically downwardly from, the underside of the slotted head 135.

The latch-pin 137 extends downwardly below the pintle 138 and is biased outwardly by means of a hairpin spring 142 which is riveted or otherwise suitably mounted upon the camming plate 141. Normally, the latch-pin 137 assumes the position shown in FIG. 4, so that its upper end is engaged in one of the detent-notches 133, thereby holding the pre-selector cam 134 in a selected longitudinal position along the pre-selector rail 130. When it is desired to move the pre-selector cam to another position, the lower portion of the latch-pin 137 is pushed inwardly, thereby releasing the pre-selector 134 so that it can be manually shifted to another desired position.

As will be noted by reference to FIG. 4, the camming plate 141 projects downwardly below the pre-selector rail 130 by a distance sufficient to strike against the outwardly extending end of the actuator-rod 119 when the detent-boss 123 thereof is engaged against the guide plate 121 so that either the forwardly presented or rearwardly presented inclined margins of the camming plate 141 will ride against the actuator-rod 119 and cam it downwardly out of retained position, thereby allowing the springs to pull the locking-bars 64, 65, 66, 67, from unlocked to locked position. The pre-selector rail 130 is mounted so that all of its associated parts will be inside the outermost vertical plane of the side wall of the truck-body B and will be protected against accidental damage in case the truck-body B should accidentally scrape against the side of a building, shipping dock, other vehicle, or similar obstruction. Of course, the outer extremities of the actuator-rod 119 will project laterally beyond the truck-body B when in outwardly retained or unlocked position, but the actuator-rod 119 is only in this position when it is necessary to effect load-equalizing adjustment between the truck-body B and the tandem T. This load-equalizing adjustment is only carried out under proper conditions when the truck-body B is relatively "in the clear," so to speak. Consequently, the externally exposed position of the actuator-rod 119, under these circumstances, presents no hazard.

To effect a load-equalizing adjustment between the truck-body B and the tandem T the truck-body B, supported at its front end upon the conventional motive tractor, is parked in some suitable or accessible location and the actuator-rod 119 manually pulled outwardly to unlocked position, thereby withdrawing the locking-bars 64, 65, 66, 67, so that the truck-body B is free to slide longitudinally with respect to the tandem T. The latch-pin 137 is then pushed in and the pre-selector cam 134 shifted longitudinally along the pre-selector rail 130 to some desired position corresponding to the adjusted load-equalizing position required for the particular load conditions of the truck-body B. The truck driver then will set the brakes on the tandem T and slowly drive the tractor forwardly or rearwardly as may be necessary so as to shift the truck-body B longitudinally with respect to the tandem T. During the course of this longitudinal shifting movement, the camming plate 147 will ride over the outwardly projecting portion of the actuator-rod 119 and knock it down off of outwardly retained position, thereby permitting the springs 75 to snap the locking-pins 64, 65, 66, 67, back into engaged position. The contact between the camming plate 141 and the actuator-rod 119, as well as the return of the locking-bars 64, 65, 66, 67, to engaged position, will produce a clearly audible sound which will carry forward to the truck driver who can immediately stop the forward or rearward movement of the tractor and the load-equalizing adjustment will be automatically completed.

It is also possible to provide a modified form of load-equalizing device A' which is substantially identical with the previously described load-equalizing device A and comprises a base-frame 1' consisting of three transversely extending spaced parallel cross-members 2', 3', 4', of identical size and shape. Notched into the top flanges 5', 6', 7', of the cross-members 2', 3', 4', and securely welded in place are longitudinally extending upwardly opening slide-channels 13', 14', which are substantially identical in shape and function with the previously described slide-channels 13, 14, and are adapted for slidably accommmodating slide-rails which are, in all respects, identical with the previously described slide-rails 21, 22. Journaled centrally in the cross-members 2', 3', 4', and extending longitudinally from end-to-end through the base-frame 1' is a shaft 30'. Rotatably mounted on the shaft 30' adjacent to and extending through the central cross-member 3' is an actuator sleeve 32' integrally provided with two pairs of diametrally outwardly extending crank arms 33'–34' and 35'–36', which are operatively spaced from the side faces of the cross-member 3' by thrust collars 37', 38'. The pairs of crank arms 33'–34' and 35'–36' are operatively connected by means of pull-rods 56', 57', 58', 59', to locking-bars 64', 65', 66', 67', which are substantially similar in construction and function to the correspondingly numbered parts of the previously described embodiment. Similarly, the crank arm 34' is operatively connected at its lower end by a pre-selector actuator-rod 119' to a handle 122'.

Rigidly secured upon the outer ends of the shaft 30' in proximate relation to the outwardly presented vertical faces of the cross-members 2' and 4', respectively, are hub-like members 150 integrally provided with diametraly opposed radially projecting arms 151, 152. As shown in FIG. 13, one of the downwardly projecting arms 152 is operatively connected at its lower end to an actuator-rod 125' which is substantially similar in all respects to the previously described actuator-rod 125. Around a portion of its periphery, the hub 150 is provided with a segmentally arranged series of gear teeth 153, which, in turn, mesh with a matching set of segmentally arranged teeth 154 formed integrally on an idler hub 155, the latter being, in turn, pivotally mounted on a short jack shaft 156, which is, in turn, journaled in and extends through the cross-member 2'.

The hub 155 is also integrally provided with an upwardly extending radial arm 157 which is similar to and matches the arm 151. At their upper ends, the arms 151, 157, are operatively mounted in slots 158, 159, of horizontal pull-rods 160, 161, respectively, the latter being operatively connected at their outer ends to locking-bars 97', 98', which are similar in construction and function to the previously described locking-bars 97, 98. As will be seen by reference to FIG. 13, the pull-rods 160, 161, are biased outwardly toward locked position by means of tension springs 162, 163, respectively.

The load-equalizing device A' presently being described differs from the previously described load-equalizing device A in that the pull-rods 160, 161, are in substantially horizontal position and will remain in such horizontal position during actuation so as to avoid any tendency toward bending when subjected to substantially heavy stresses.

It should be understood that changes and modifications in the form, construction, arrangement, and combination of the several parts of the load-carrying vehicles, may be made and substituted for those herein shown and described without departing from the nature and principle of my invention.

Having thus described my invention, what I claim and desire to secure by Letters Patent is:

1. A load-equalizing device for adjustably connecting truck-bodies to running gear, said load-equalizing device comprising a base-frame extending in a lengthwise direction with respect to the truck-body, a plurality of slide-channels mounted on the base-frame adjacent to the outer longitudinal side margins of the truck-body and extending in said lengthwise direction, a plurality of longitudinally extending slide-rails adapted to be mounted on the underside of the truck-body adjacent the outer longitudinal margins thereof in vertical alignment with the slide-channels, said slide rails being provided with a longitudinally extending series of apertures, each of said slide-rails being provided with a pair of longitudinally extending laterally projecting horizontal flanges, means operatively mounted on the base-frame for engaging a selected aperture in each of the slide-rails above one of said horizontal flanges to prevent longitudinal shifting movement between the slide-channels and the slide-rails, manually operable means for disengaging said last-named means, means operatively mounted on the base-frame for slidably engaging the other flange of said pair of horizontal flanges of said slide-rails to prevent substantial vertical relative movement between the slide-rails and slide-channels, and separate manually operable means for disengaging the last-named means.

2. A load-equalizing device according to claim 1 further characterized in that the second manually operable means includes a pair of mutually meshing tooth members.

3. A load-equalizing device for adjustably connecting truck-bodies to running gear, said load-equalizing device comprising a base-frame extending in a lengthwise direction with respect to the truck-body, a plurality of slide-channels mounted on the base-frame adjacent to the outer longitudinal side margins of the truck-body and extending in said lengthwise direction, a plurality of longitudinally extending slide-rails adapted to be mounted on the underside of the truck-body adjacent the outer longitudinal margins thereof in vertical alignment with the slide-channels, said slide-rails being provided with a longitudinal series of apertures, each of said slide-rails further being provided with a pair of longitudinally extending lateral projecting horizontal flanges, first locking means operatively mounted on the base-frame for engaging a selected aperture in each of the slide-rails above any one of said horizontal flanges of the slide-rails at any one of several selected positions to prevent longitudinal shifting movement between the slide-channels and the slide-rails, said first locking means including a first set of locking bars which are adapted to engage said slide-rails, first manually operable means for disengaging said last-named means, second locking means operatively mounted on the base-frame for slidably engaging at least one of the slide-rails to prevent substantial vertical relative movement between the slide-rails and slide-channels, said second locking means including a second set of locking bars which are adapted to engage said slide-rails, second manually operable means for disengaging the last-named means, detent means operatively associated with the first manually operable means for holding said manually operable means and said first locking means in disengaged position, and adjustable pre-selector means operatively associated with the slide-rails and being adapted upon relative shifting movement between the slide-rails and the slide-channels to disengage the detent means so that the first manually operable means and said first locking means will return to engaged position.

4. A load-equalizing device for adjustably connecting truck-bodies to running gear, said load-equalizing device comprising a base-frame extending in a lengthwise direction with respect to the truck-body, a plurality of slide-channels mounted on the base-frame adjacent to the outer longitudinal side margins of the truck-body and extending in said lengthwise direction, a plurality of longitudinally extending slide-rails adapted to be mounted on the underside of the truck-body adjacent the outer longitudinal margins thereof in vertical alignment with the slide-channels, said slide-rails being provided with a longitudinal series of apertures, each of said slide-rails further being provided with a pair of longitudinally extending lateral projecting horizontal flanges, said horizontal flanges being disposed on opposite sides of the rail of which they are a part, one of said horizontal flanges of each rail being located in upwardly spaced relation to the other horizontal flange of such rail, first locking means operatively mounted on the base-frame for engaging a selected aperture in each of the slide-rails above one of said horizontal flanges of the lowermost one of said pair of horizontal flanges of the slide-rails at any one of several selected positions to prevent longitudinal shifting movement between the slide-channels and the slide-rails, said first locking means including a first set of locking-bars which are adapted to engage said slide-rails, first manually operable means for disengaging said last-named means, said first manually operable means including a first horizontal pull-rod means which is operatively connected to said first locking means for shifting the latter into and out of engaged position, second locking means operatively mounted on the base-frame for slidably engaging at least one of the slide-rails to prevent substantial vertical relative movement between the slide-rails and slide-channels, said second locking means including a second set of locking-bars which are adapted to engage said slide-rails, second manually operable means for disengaging the last-named means, detent means operatively associated with the first manually operable means for holding said manually operable means and said first locking means in disengaged position, and adjustable pre-selector means operatively associated with the slide-rails and being adapted upon relative shifting movement between the slide-rails and the slide-channels to disengage the detent means so that the first manually operable means and said first locking means will return to engaged position.

5. A load-equalizing device for adjustably connecting truck-bodies to running gear, said load-equalizing device comprising a base-frame extending in a lengthwise direction with respect to the truck-body, a plurality of slide-channels mounted on the base-frame adjacent to the outer longitudinal side margins of the truck-body and extending in said lengthwise direction, a plurality of longitudinally extending slide-rails adapted to be mounted on the underside of the truck-body adjacent the outer longitudinal margins thereof in vertical alignment with the slide-channels, said slide-rails being provided with a longitudinal series of apertures, each of said slide-rails further being provided with a pair of longitudinally extending lateral projecting horizontal flanges, said horizontal flanges being disposed on opposite sides of the rail of which they are a part, one of said horizontal flanges of each rail being located in upwardly spaced relation to the other horizontal flange of such rail, first locking means operatively mounted on the base-frame for engaging a selected aperture in each of the slide-rails above one of said horizontal flanges of the lowermost one of said pair of horizontal flanges of the slide-rails at any one of several selected positions to prevent longitudinal shifting movement between the slide-channels and the slide-rails, said first locking means including a first set of locking-bars which are adapted to engage said slide-rails, first manually operable means for disengaging said last-named means, said first manually operable means including a first horizontal pull-rod means which is operatively connected to said first locking means for shifting the latter into and out of engaged position, second locking means operatively mounted on the base-frame for slidably engaging at least one of the slide-rails to prevent substantial vertical relative movement between the slide-rails and slide-channels, said second locking means including a second set of locking-bars which are adapted to engage said slide-rails, second manually operable means for disengaging the last-named means, said second manually operable means including a second horizontal pull-rod which is operatively connected to said second locking means for shifting the latter into and out of engaged position, detent means operatively associated with the first manually operable means for holding said first manually operable means and said first locking means in disengaged position, and adjustable pre-selector means operatively associated with the slide-rails and being adapted upon relative shifting movement between the slide-rails and the slide-channels to disengage the detent means so that the first manually operable means and said first locking means will return to engaged position.

6. A load-equalizing device for adjustably connecting truck-bodies to running gear, said load-equalizing device comprising a base-frame extending in a lengthwise direction with respect to the truck-body, a plurality of slide-channels mounted on the base-frame adjacent to the outer longitudinal side margins of the truck-body and extending in said lengthwise direction, a plurality of longitudinally extending slide-rails adapted to be mounted on the underside of the truck-body adjacent the outer longitudinal margins thereof in vertical alignment with the slide-channels, said slide-rails being provided with a longitudinal series of apertures, each of said slide-rails further being provided with a pair of longitudinally extending lateral projecting horizontal flanges, said horizontal flanges being disposed on opposite sides of the rail of which they are a part, one of said horizontal flanges of each rail being located in upwardly spaced relation to the other horizontal flange of such rail, first locking means operatively mounted on the base-frame for engaging a selected aperture in each of the slide-rails above one of said horizontal flanges of the lowermost one of said pair of horizontal flanges of the slide-rails at any one of several selected positions to prevent longitudinal shifting movement between the slide-channels and the slide-rails, said first locking means including a first set of locking-bars which are adapted to engage said slide-rails, first manually operable means for disengaging said last-named means, said first manually operable means including a first horizontal pull-rod means which is operatively connected to said first locking means for shifting the latter into and out of engaged position, second locking means operatively mounted on the base-frame for slidably engaging at least one of the slide rails to prevent substantial vertical relative movement between the slide-rails and slide-channels, said second locking means including a second set of locking-bars which are adapted to engage said slide-rails, and second manually operable means for disengaging the last-named means, said second manually operable means including a second horizontal pull-rod which is operatively connected to said second locking means for shifting the latter into and out of engaged position.

7. A load-equalizing device for adjustably connecting truck-bodies to running gear, said load-equalizing device comprising a base-frame extending in a lengthwise direction with respect to the truck-body, a plurality of slide-channels mounted on the base-frame adjacent to the outer longitudinal side margins of the truck-body and extending in said lengthwise direction, a plurality of longitudinally extending slide-rails adapted to be mounted on the underside of the truck-body adjacent the outer longitudinal margins thereof in vertical alignment with the slide-channels, said slide-rails being provided with a longitudinal series of apertures, each of said slide-rails further being provided with a pair of longitudinally extending lateral projecting horizontal flanges, said horizontal flanges being disposed on opposite sides of the rail of which they are a part, one of said horizontal flanges of each rail being located in upwardly spaced relation to the other horizontal flange of said rail, means operatively mounted on the base-frame for engaging a selected aperture in each of the slide-rails above one of said horizontal flanges to prevent longitudinal shifting movement between the slide-channels and the slide-rails, manually operable means for disengaging said last-named means, means operatively mounted on the base-frame for slidably engaging the other flanges of said pair of horizontal flanges of said slide-rails to prevent substantial vertical relative movement between the slide-rails and slide-channels, and separate manually operable means for disengaging the last-named means.

References Cited by the Examiner

UNITED STATES PATENTS

| | | |
|---|---|---|
| 1,303,854 | 5/19 | Clark. |
| 2,071,092 | 2/37 | Troy ------------------ 292—39 |
| 2,839,311 | 6/58 | Locker ---------------- 280—81 |
| 2,900,194 | 8/59 | De Lay. |
| 2,993,728 | 7/61 | Beran et al. |
| 3,004,772 | 10/61 | Bohlen et al. |
| 3,087,741 | 4/63 | De Lay. |

FOREIGN PATENTS 1,140,746  3/57  France.

A. HARRY LEVY, *Primary Examiner.*

PHILIP ARNOLD, KENNETH H. BETTS, *Examiners.*